US008903776B2

(12) United States Patent
Nagaraja et al.

(10) Patent No.: US 8,903,776 B2
(45) Date of Patent: Dec. 2, 2014

(54) CACHING SOCKET CONNECTIONS WHILE ENSURING THAT THERE ARE FILE DESCRIPTORS AVAILABLE FOR THE APPLICATIONS

(75) Inventors: Pramod B. Nagaraja, Bangalore (IN); Sathiskumar Palaniappan, Bangalore (IN); Deepti Verma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 13/227,926

(22) Filed: Sep. 8, 2011

(65) Prior Publication Data
US 2013/0066928 A1 Mar. 14, 2013

(51) Int. Cl.
G06F 7/00 (2006.01)
G06F 17/00 (2006.01)
G06F 9/50 (2006.01)
H04L 29/08 (2006.01)
G06F 12/02 (2006.01)

(52) U.S. Cl.
CPC ............... *H04L 69/32* (2013.01); *G06F 9/5016* (2013.01); *G06F 12/0253* (2013.01); *H04L 67/146* (2013.01); *G06F 9/5022* (2013.01)
USPC .......................... 707/664; 707/813; 707/820

(58) Field of Classification Search
USPC .................. 707/664, 661, 662, 813, 820
See application file for complete search history.

(56) References Cited

U.S. PATENT DOCUMENTS 6,820,127 B2  11/2004  Banerjee
7,203,756 B2   4/2007  Tapperson
7,269,692 B2 *  9/2007  Irudayaraj ..................... 711/118
7,698,413 B1   4/2010  Minami et al.
7,801,998 B2   9/2010  Mazzagatte et al.

OTHER PUBLICATIONS

Ram et al., "Explaining the Impact of Network Transport Protocols on SIP Proxy Performance," http://www.cs.rice.edu/CS/Architecture/docs/ram-ispass08.pdf, The International Symposium on Performance Analysis of Systems and Software (ISPASS), Austin, TX, (Apr. 2008).
Anuradha et al., "StormCast A Cooperative Caching System Using GDSP Algorithm," http://www.cs.uky.edu/~singhal/term-papers/StormCast.pdf, Apr. 2002.
Dumitran, Octavian-Daniel, "Fixing File Descriptor Leaks," http://dspace.mit.edu/bitstream/handle/1721.1/41645/219706931.pdf, Jun. 2007.

(Continued)

*Primary Examiner* — Usmaan Saeed
*Assistant Examiner* — Paul Kim
(74) *Attorney, Agent, or Firm* — Robert A. Voigt, Jr.; Winstead, P.C.

(57) ABSTRACT

A method, system and computer program product for caching socket connections while ensuring that there are file descriptors available for the applications. File descriptor references and their referenced objects are stored in a predefined memory region of the heap ("file descriptor heap"). Each time a socket connection is cached, a file descriptor reference may be created to be associated with the socket connection's file descriptor, where the file descriptor reference references the object of the cached socket connection. In order to ensure that there are available file descriptors for the applications, the file descriptor references and their referenced objects are collected by the garbage collector in response to various events (e.g., too many file descriptors are open) thereby freeing the file descriptors that were previously associated with the collected connection objects to be used by the applications.

9 Claims, 6 Drawing Sheets

(56) References Cited

OTHER PUBLICATIONS

Calsavara, Alexandre, "Java Reference Objects Make Caching Easy," http://articles.techrepublic.com.com/5100-10878__11-1049546.html#, Mar. 14, 2003.

Ban et al., "Chapter 6: Eviction Policies," "JBoss Cache TreeCache—A Structured, Replicated, Transactional Cache," http://docs.jboss.org/jbosscache/1.4.0/TreeCache/en/html/eviction_policies.html, Jul. 2006.

"PhantomReference (Java 2 Platform SE v1.4.2)," http://download.oracle.com/javase/1.4.2/docs/api/java/lang/ref/PhantomReference.html, 2010.

"Python Garbage Collection," http://www.digi.com/wiki/developer/index.php/Python_Garbage_Collection, Dec. 13, 2010.

"Event Driven Programming," http://www.c2.com/cgi/wiki?EventDrivenProgramming, Aug. 2, 2011.

* cited by examiner

CACHING SOCKET CONNECTIONS WHILE ENSURING THAT THERE ARE FILE DESCRIPTORS AVAILABLE FOR THE APPLICATIONS

TECHNICAL FIELD

The present invention relates to caching socket connections, and more particularly to caching socket connections while ensuring that there are file descriptors available for the applications.

BACKGROUND

When a socket connection (an endpoint for communication between two machines) is instantiated, such as a Remote Method Invocation (RMI) or an Object Request Broker (ORB) connection, the socket connection may be cached for reuse due to the fact that it is an expensive process in creating a socket connection in terms of time and resources.

Whenever a socket connection is cached though, it reduced the total available file descriptors (an indicator for accessing a file/socket) to be used by the applications of the system as every end point of the socket connection creates and maintains a socket. If a substantial number of socket connections are cached, and as a result, a substantial number of file descriptors are used, then there may not be any file descriptors available for the applications. For example, if the maximum file descriptor limit is set to 1,024, and the number of file descriptors used to refer to the cached socket connections reaches 1,024, then there will not be any file descriptors available for the applications.

In an attempt to ensure that there will be file descriptors available for the applications, a time out period for which the socket connections are maintained in the cache may be implemented. When the time out period is reached, the socket connections are cleared from the cache, and their file descriptors become available. However, the time period may be set too low thereby clearing the cache pre-maturely defeating the purpose of having a cache. However, if the time period is set too high, then too many socket connections may be cached resulting in few, if any, available file descriptors for the applications.

Another attempt to ensure that there will be file descriptors available for the applications is to use a monitoring tool to monitor file descriptor leaks, referring to the situation when memory is consumed for file descriptors but is unable to be released back to the operating system. However, such a technique does not address the situation of having file descriptors created when socket connections are cached.

As a result, there is not currently an effective technique in caching socket connections while ensuring that there are file descriptors available for the applications in the system.

BRIEF SUMMARY

In one embodiment of the present invention, a method for caching socket connections while ensuring that there are file descriptors available for applications comprises creating a file descriptor reference to be associated with a cached socket connection, where the file descriptor reference references an object of the cached socket connection. The method further comprises storing, by a processor, the file descriptor reference and the object of the cached socket connection in a predefined memory area of a heap.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for caching socket connections while ensuring that there are file descriptors available for the applications. In one embodiment of the present invention, the memory region of the heap is partitioned into at least two memory regions, where one of the memory regions (referred to herein as the "file descriptor heap") stores file descriptor references and their referenced objects. Each time a socket connection is cached, a file descriptor reference may be created to be associated with the socket connection's file descriptor, where the file descriptor reference references the object of the cached socket connection. In order to ensure that there are available file descriptors for the applications, the file descriptor references and their referenced objects stored in the file descriptor heap may be collected by the garbage collector in response to various events (e.g., too many file descriptors are open, file descriptor heap reached its storage capacity) thereby freeing the file descriptors that were previously associated with the collected connection objects to be used by the applications. In this manner, socket connections can be cached while ensuring that there are file descriptors available for the applications.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
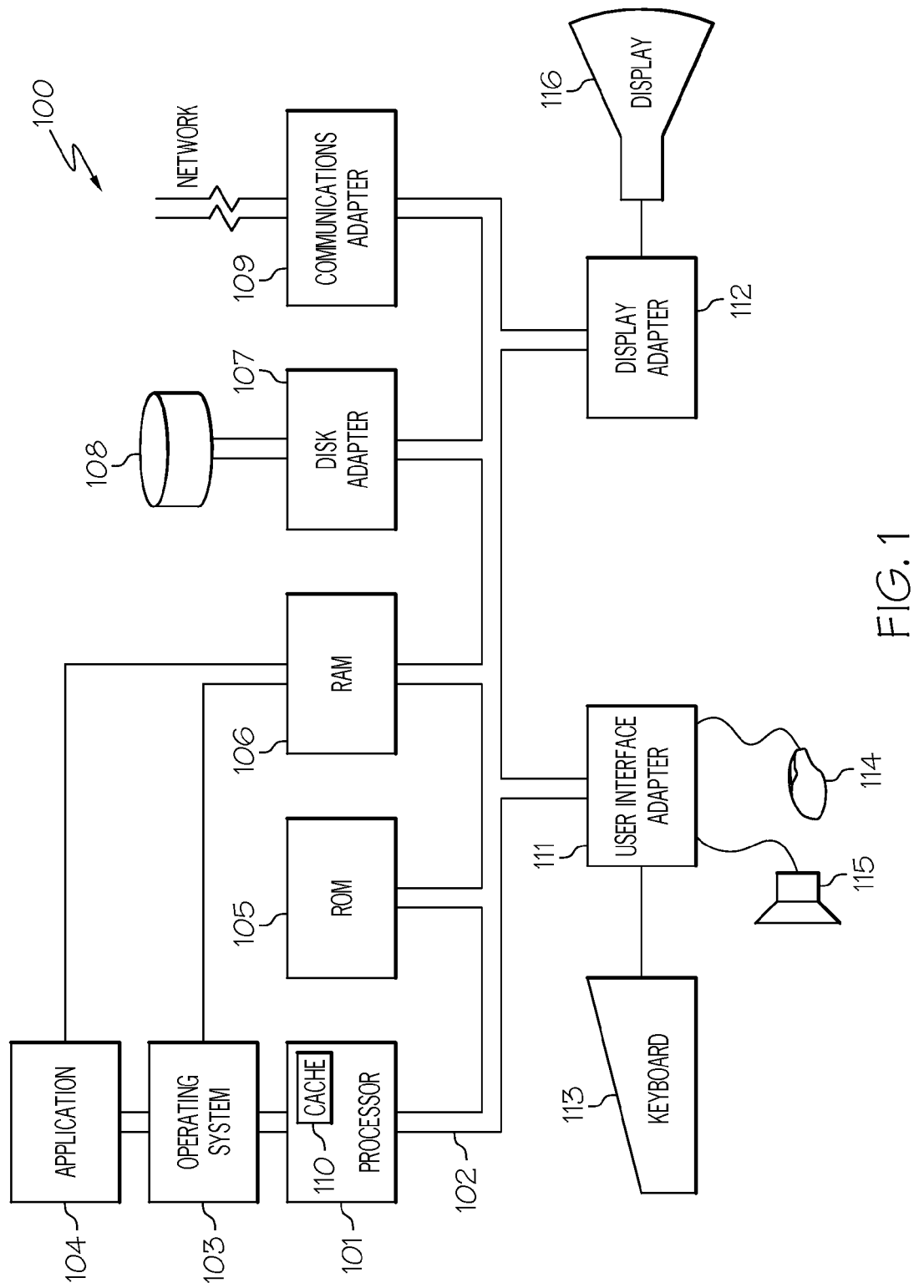
FIG. 1 illustrates a hardware configuration of a computer system configured in accordance with an embodiment of the present invention.

Referring now to the Figures in detail, FIG. 1 illustrates a hardware configuration of a computer system 100 which is representative of a hardware environment for practicing the present invention. Referring to FIG. 1, computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, an application for caching socket connections while ensuring that there are file descriptors available for applications as discussed further below in association with FIGS. 2-6.

Referring again to FIG. 1, read-only memory ("ROM") 105 is coupled to system bus 102 and includes a basic input/output system ("BIOS") that controls certain basic functions of computer device 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for caching socket connections while ensuring that there are file descriptors available for applications, as discussed further below in association with FIGS. 2-6, may reside in disk unit 108 or in application 104.

Computer system 100 may further include a communications adapter 109 coupled to bus 102. Communications adapter 109 interconnects bus 102 with an outside network thereby enabling computer system 100 to communicate with other similar devices.

Additionally, computer system 100 may include a cache 110, such as a level-1 cache, for caching socket connections. While cache 110 is shown to be internal within processor 101, cache 110 may be located external to processor. Cache 110 may be any type of cache (e.g., physically indexed, physically tagged; virtually indexed, virtually tagged; virtually indexed, physically tagged).

I/O devices may also be connected to computer system 100 via a user interface adapter 111 and a display adapter 112. Keyboard 113, mouse 114 and speaker 115 may all be interconnected to bus 102 through user interface adapter 111. Data may be inputted to computer system 100 through any of these devices. A display monitor 116 may be connected to system bus 102 by display adapter 112. In this manner, a user is capable of inputting to computer system 100 through keyboard 113 or mouse 114 and receiving output from computer system 100 via display 116 or speaker 115.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, whenever a socket connection is cached, a file descriptor (an indicator for accessing a file) is used to refer to the cached socket connection which reduces the total available file descriptors to be used by the applications of the system. If a substantial number of socket connections are cached, and as a result, a substantial number of file descriptors are used, then there may not be any file descriptors available for the applications. For example, if the maximum file descriptor limit is set to 1,024, and the number of file descriptors used to refer to the cached socket connections reaches 1,024, then there will not be any file descriptors available for the applications. Currently, there is not an effective technique in caching socket connections while ensuring that there are file descriptors available for the applications in the system.

Figure 2:
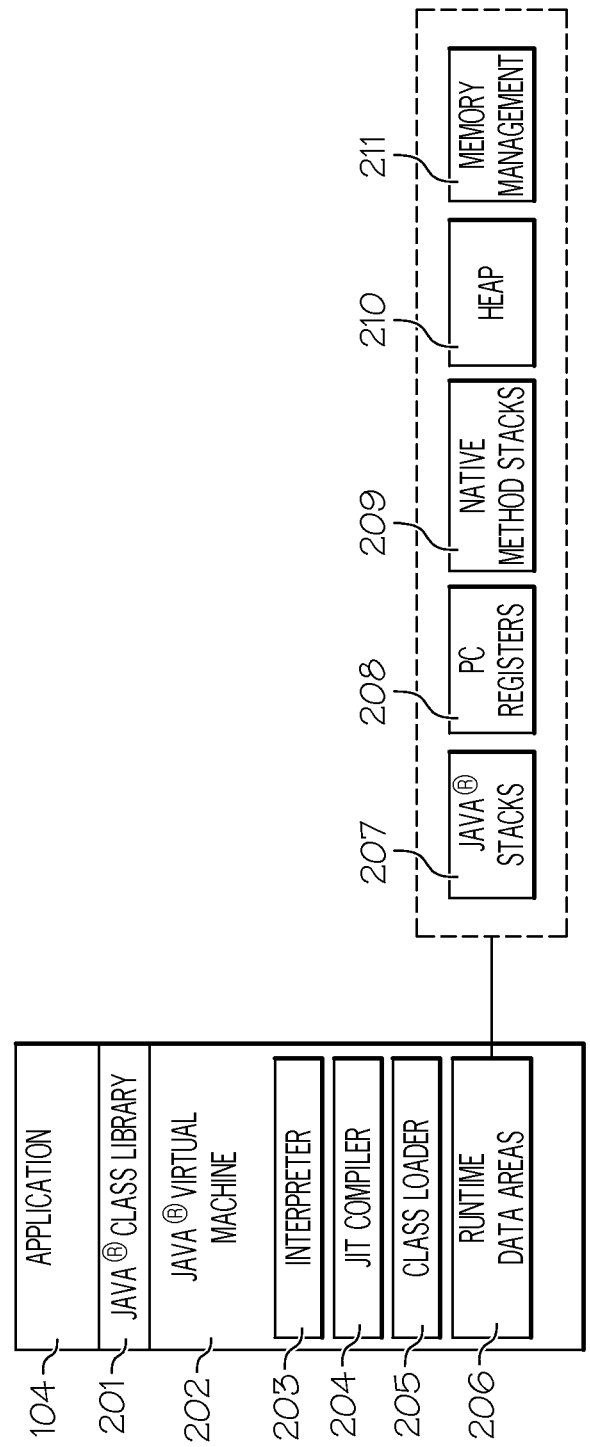
FIG. 2 illustrates a stack model of a Java® virtual machine with a heap partitioned into memory regions, including a memory region dedicated to store file descriptor references and their referenced objects in accordance with an embodiment of the present invention.
Figure 3:
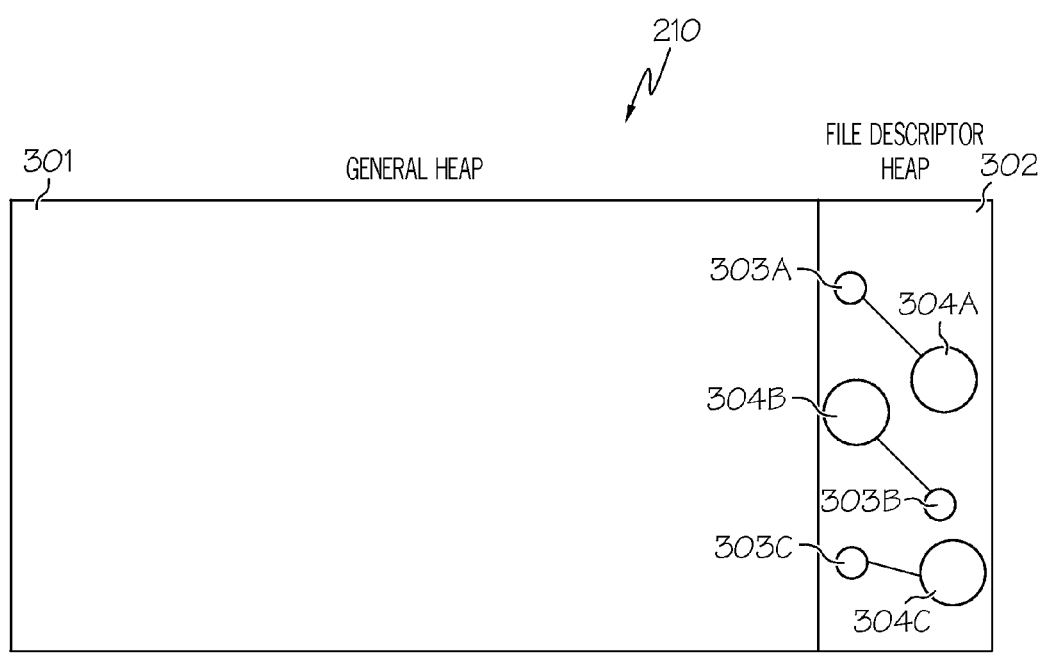
FIG. 3 illustrates a heap including a predefined memory region for storing file descriptor references and their referenced objects in accordance with an embodiment of the present invention.
Figure 4:
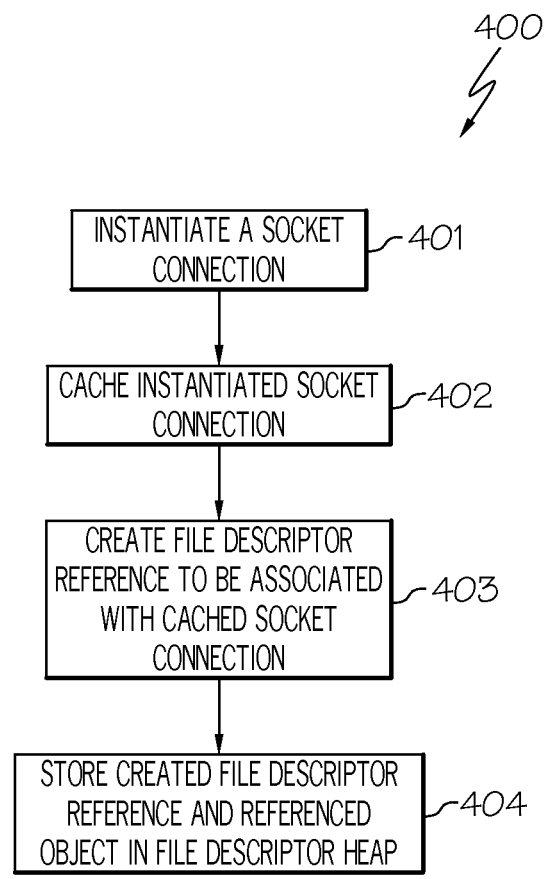
FIG. 4 is a flowchart of a method for having the predefined memory region of the heap store the file descriptor references and their referenced objects in accordance with an embodiment of the present invention.
Figure 5:
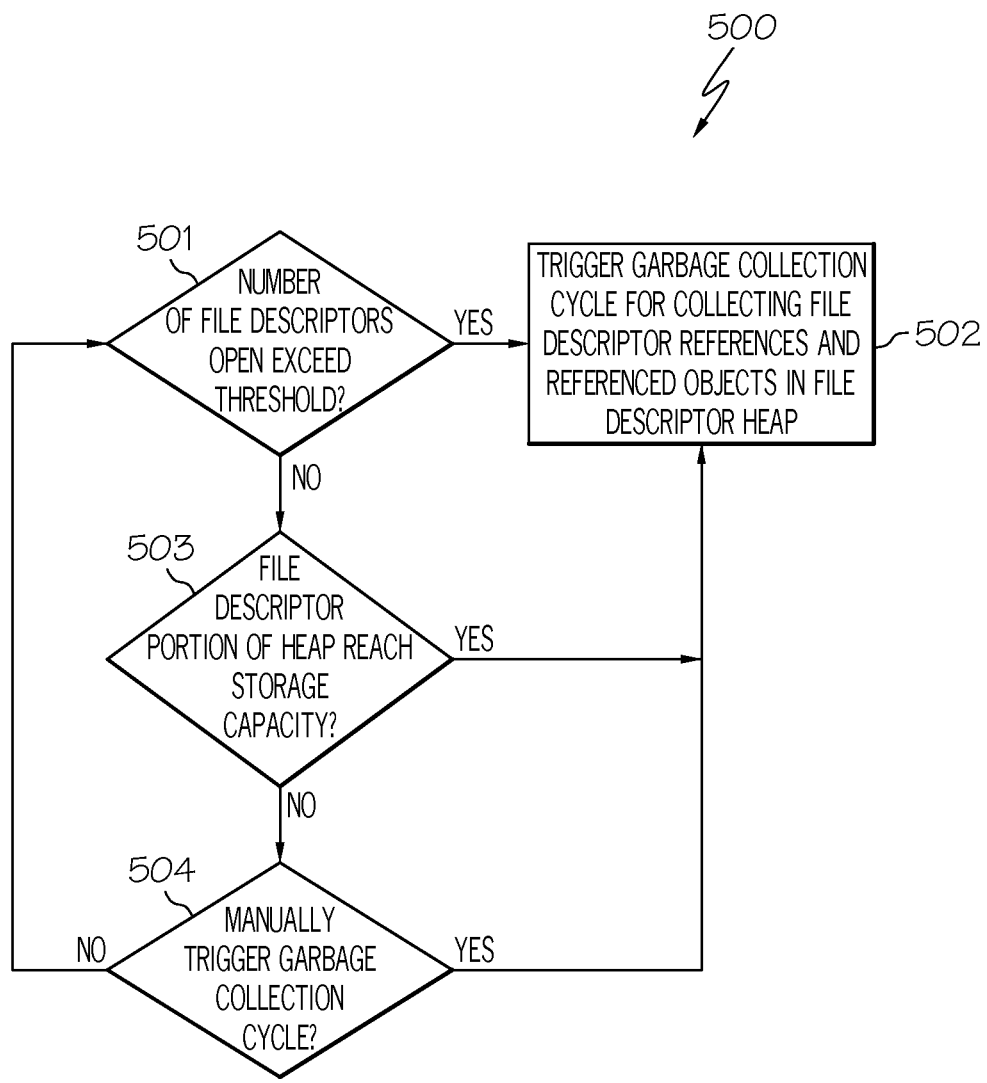
FIG. 5 is a flowchart of a method for determining when a garbage collection cycle will be implemented for removing the file descriptor references and their referenced objects from the predefined memory region of the heap in accordance with an embodiment of the present invention.
Figure 6:
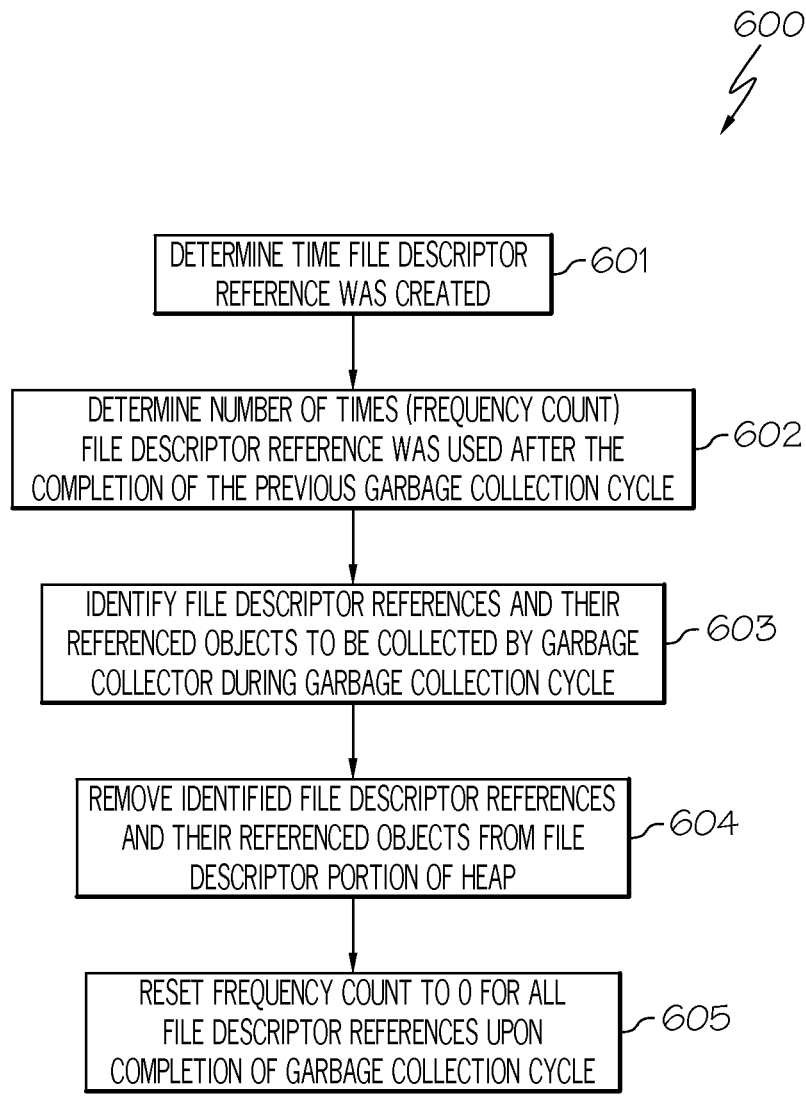
FIG. 6 is a flowchart of a method for removing the selected file descriptor references and their referenced objects from the predefined memory region of the heap during a garbage collection cycle in accordance with an embodiment of the present invention.

The principles of the present invention provide a technique in caching socket connections while ensuring that there are file descriptors available for the applications as discussed below in connection with FIGS. 2-6. FIG. 2 is a stack model of a Java® virtual machine with a heap partitioned into memory regions, including a memory region dedicated to store file descriptor references and their referenced objects. FIG. 3 illustrates a heap including a predefined memory region for storing file descriptor references and their referenced objects. FIG. 4 is a flowchart of a method for having a predefined memory region of the heap store file descriptor references and their referenced objects. FIG. 5 is a flowchart of a method for determining when a garbage collection cycle will be implemented for removing file descriptor references and their referenced objects from the predefined memory region of the heap. FIG. 6 is a flowchart of a method for removing selected file descriptor references and their referenced objects from the predefined memory region of the heap during a garbage collection cycle.

As stated above, FIG. 2 is a stack model of a Java® virtual machine with a heap partitioned into memory regions, including a memory region dedicated to store file descriptor references and their referenced objects in accordance with an embodiment of the present invention.

Referring to FIG. 2, in conjunction with FIG. 1, application 104 (e.g., Java® application) can call at runtime a Java® class library 201, which is a set of dynamically loadable libraries. Java® class library 201 runs on a virtual machine 202, such as a Java® Virtual Machine ("JVM"). JVM 202 is one software application that may execute in conjunction with operating system 103. JVM 202 provides a Java® run-time environment with the ability to execute a Java® application or applet, which is a program, servlet, or software component written in the Java® programming language.

JVM 202 is a virtual computer component that executes Java® programs 104. Java® programs 104 are not run directly by the central processor (e.g., processor 101 of FIG. 1) but instead by JVM 202, which is itself a piece of software running on the processor. JVM 202 allows Java® programs to be executed on different platforms, as opposed to only the one platform for which the code was compiled. Java® programs are compiled for JVM 202. In this manner, Java® is able to support applications for many types of data processing systems, which may contain a variety of central processing units and operating system architectures. To enable a Java® application to execute on different types of data processing systems, a compiler typically generates an architecture-neutral file format (i.e., the compiled code is executable on many processors, given the presence of the Java® run-time system). The Java® compiler generates bytecode instructions that are nonspecific to a particular computer architecture. A bytecode is a machine independent code generated by the Java® compiler and executed by a Java® interpreter 203. Java® interpreter 203 is part of JVM 202 that alternately decodes and interprets a bytecode or bytecodes. These bytecode instructions are designed to be easy to interpret on any computer and easily translated on the fly into native machine code. Bytecodes may be translated into native code by a Just-In-Time (JIT) compiler 204.

JVM 202 loads class files and executes the bytecodes within them. JVM 202 contains a class loader 205, which loads class files from an application and the class files from the Java® application programming interfaces (APIs) which are needed by the application.

One type of software-based execution engine is JIT compiler 204. With this type of execution, the bytecodes of a method are compiled to native machine code upon successful fulfillment of some type of criteria for just-in-time compiling a method.

When an application 104 is executed on JVM 202, a Java® application may interact with the host operating system 103 by involving native methods. A Java® method is written in the Java® language, compiled to bytecodes, and stored in class files. A native method is written in some other language and compiled to the native machine code of a particular processor. Native methods are stored in a dynamically linked library whose exact form is platform specific.

Referring again to FIG. 2, JVM 202 further includes runtime data areas 206. Runtime data areas 206 contain Java® stacks 207, Program Counter (PC) registers 208, native method stacks 209, a Java® heap 210 and memory management 211. These different data areas represent the organization of memory needed by JVM 202 to execute a program.

Java® stacks 207 are used to store the state of Java® method invocations. When a new thread is launched, JVM 202 creates a new Java® stack for the thread. JVM 202 performs only two operations directly on Java stacks 207: it pushes and pops frames. A thread's Java® stack stores the state of Java® method invocations for the thread. The state of a Java® method invocation includes its local variables, the parameters with which it was invoked, its return value, if any, and intermediate calculations. Java® stacks are composed of stack frames. A stack frame contains the state of a single Java® method invocation. When a thread invokes a method, JVM 202 pushes a new frame onto the Java® stack of the thread. When the method completes, JVM 202 pops the frame for that method and discards it. JVM 202 does not have any registers for holding intermediate values; any Java® instruction that requires or produces an intermediate value uses the stack for holding the intermediate values. In this manner, the Java® instruction set is well defined for a variety of platform architectures.

PC registers 208 are used to indicate the next instruction to be executed. Each instantiated thread gets its own PC register (program counter) and Java® stack. If the thread is executing a JVM method, the value of the PC register indicates the next instruction to execute. If the thread is executing a native method, then the contents of the PC register are undefined.

Native method stacks 209 store the state of invocations of native methods. The state of native method invocations is stored in an implementation-dependent way in native method stacks, registers, or other implementation-dependent memory areas. In some JVM implementations, native method stacks 209 and Java® stacks 207 are combined.

Java® heap 210 contains all instantiated objects. Each time a class instance or array is created, the memory for the new object is allocated from heap 210. In one embodiment, heap 210 may be divided into multiple regions, where one region is dedicated to storing file descriptor references and objects referenced by these references, as discussed further below in connection with FIG. 3. In this manner, socket connections may be cached while ensuring that there are file descriptors available for applications as discussed further below.

Memory management 211 in the depicted example manages memory space within the memory allocated to heap 210. Memory management 211 may include a "garbage collector," which automatically reclaims memory used by objects that are no longer referenced. Additionally, a garbage collector may also move objects to reduce heap fragmentation.

As stated above, FIG. 3 illustrates a heap 210 (FIG. 2) including a predefined memory region for storing file descriptor references and their referenced objects in accordance with an embodiment of the present invention. Referring to FIG. 3, in conjunction with FIG. 2, heap 210 includes memory areas or regions for storing instantiated objects. Memory region 301 (labeled as "General Heap" in FIG. 3) corresponds to the memory area for storing all instantiated objects besides the file descriptor references and their referenced objects. Memory region 302 (labeled as "File Descriptor Heap" in FIG. 3) corresponds to the memory area for storing file descriptor references and their referenced objects.

As discussed above, when a socket connection is instantiated, a file descriptor (an indicator for accessing a file) is used to refer to the cached socket connection. To ensure that there are file descriptors available to be used by the applications, a new reference type, referred to herein as the "file descriptor reference," is created each time a file descriptor is used to refer to the cached socket connection. The file descriptor reference references the cached socket connection. These file descriptor references, along with the objects they reference (i.e., the connection objects), are stored in file descriptor heap 302 as illustrated in FIG. 3. As will be discussed further below, by having these file descriptor references, it is possible to trace the number of file descriptors being allocated for caching socket connections and to determine if the number of cached socket connections needs to be reduced thereby ensuring that there are available file descriptors for the applications.

Referring again to FIG. 3, file descriptor heap 302 stores file descriptor references 303A-303C along with their referenced objects 304A-304C. File descriptor references may collectively or individually be referred to as file descriptor references 303 or file descriptor reference 303, respectively. Furthermore, objects 304A-304C may collectively or individually be referred to as objects 304 or object 304, respectively. While FIG. 3 illustrates three file descriptor references 303/objects 304, file descriptor heap 302 may store any number of descriptor references 303/objects 304. In one embodiment, the size of the memory region of file descriptor heap 302 is much smaller than the size of the memory region of general heap 301 since it serves to only store file descriptor references 303 and their referenced objects 304. By having a separate memory region in heap 210 dedicated to storing file descriptor references 303 and their referenced objects 304, a dedicated garbage collection cycle may be used to operate only on the file descriptor heap 302 and collect the file descriptor references 303 and referenced objects 304 as discussed further below in connection with FIG. 4. As a result, those threads that are accessing objects in general heap 301 will not be stopped when the garbage collection process is in progress for collecting file descriptor references 303/objects 304. Furthermore, since the size of file descriptor heap 302 is much smaller than the size of the memory region of general heap 301, the duration of the garbage collection cycle for collecting descriptor references 303/objects 304 will be very small in comparison to the duration of the garbage collection cycle for collecting objects in general heap 301 thereby not adversely affecting application performance.

A method for having a predefined memory region 302 in heap 210 for storing file descriptor references 303 and their referenced objects 304 is discussed below in connection with FIG. 4.

FIG. 4 is a flowchart of a method 400 for having a predefined memory region 302 (FIG. 3) in heap 210 (FIGS. 2 and 3) for storing file descriptor references 303 (FIG. 3) and their referenced objects 304 (FIG. 3) in accordance with an embodiment of the present invention.

Referring to FIG. 4, in conjunction with FIGS. 1-3, in step 401, a socket connection is instantiated. In step 402, the instantiated socket connection is cached in a cache (e.g., cache 110).

In step 403, a file descriptor reference is created to be associated with the cached socket connection. The created file descriptor reference references the object associated with the cached socket connection (i.e., the socket connection object).

In step 404, the file descriptor reference and the referenced object (i.e., the socket connection object) are stored in file descriptor heap 302.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

In order to ensure that there are available file descriptors for the applications, the file descriptor references 303 and their referenced connection objects 304 stored in file descriptor heap 302 may be collected by the garbage collector at various times thereby freeing the file descriptors that were previously associated with the collected connection objects to be used by the applications. A flowchart of a method for determining when a garbage collection cycle will be implemented for removing file descriptor references 303 and their referenced objects 304 from file descriptor heap 302 is discussed below in connection with FIG. 5.

FIG. 5 is a flowchart of a method 500 for determining when a garbage collection cycle will be implemented for removing file descriptor references 303 (FIG. 3) and their referenced objects 304 (FIG. 3) from file descriptor heap 302 (FIG. 3) in accordance with an embodiment of the present invention.

Referring to FIG. 5, in conjunction with FIGS. 1-3, in step 501, a determination is made as to whether the number of file descriptors being open exceeds a threshold. File descriptors may be created in connection with the creation of sockets, files, pipes, etc. A threshold may be set as to the number of file descriptors to be open in order to ensure that there remains a sufficient number of file descriptors to be available for the applications.

If the number of file descriptors being open exceeds a threshold, then, in step 502, a garbage collection cycle for collecting the file descriptor references 303 and their referenced objects 304 in file descriptor heap 302 is triggered. A discussion of the garbage collection cycle is provided below in connection with FIG. 6.

If, however, the number of file descriptors does not exceed a threshold, then, in step 503, a determination is made as to whether file descriptor heap 302 has reached its storage capacity.

If file descriptor heap 302 reaches its storage capacity, then, the garbage collection cycle for collecting the file descriptor references 303 and their referenced objects 304 in file descriptor heap 302 is triggered in step 502.

If, however, file descriptor heap 302 has not reached its storage capacity, then, in step 504, a determination is made as to whether the garbage collection cycle is manually triggered. For example, a function could be defined that triggers the garbage collection cycle upon execution of that function.

If the garbage collection cycle has been manually triggered, then the garbage collection cycle for collecting the file descriptor references 303 and their referenced objects 304 in file descriptor heap 302 is triggered in step 502.

If, however, the garbage collection cycle has not been manually triggered, then a determination is made as to whether the number of file descriptors being open exceeds a threshold in step 501.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

A method for selecting which file descriptor references 303 and their referenced objects 304 to be collected is discussed below in connection with FIG. 6.

FIG. 6 is a flowchart of a method 600 for removing selected file descriptor references 303 (FIG. 3) and their referenced objects 304 (FIG. 3) from file descriptor heap 302 (FIG. 3) during a garbage collection cycle in accordance with an embodiment of the present invention.

Referring to FIG. 6, in conjunction with FIGS. 1-3, in step 601, for each file descriptor reference 303, a time that file descriptor reference 303 was created (see step 403 of FIG. 4) is determined.

In step 602, for each file descriptor reference 303, a number of times (frequency count) that file descriptor reference 303 was used after the completion of the previous garbage collection cycle for file descriptor heap 302 is determined. In one embodiment, a least recently used policy may be used in deciding which file descriptor references 303 and referenced objects 304 to be collected. Such a policy may be enacted by determining the number of times that each file descriptor reference 303 was used. Those file descriptor references 303 (and their referenced objects 304) that were least recently used would be the first to be collected.

In step 603, the file descriptor references 303 and their referenced objects 304 to be collected (i.e., cleaned) by the garbage collector during the garbage collection cycle for file descriptor heap 302 are identified based on the determinations made in steps 601 and 602. For example, a policy for collecting file descriptor references 303/objects 304 may be based on frequency count and the time created. For instance, suppose that there are three file descriptor references 303 (e.g., file descriptor reference 303A, file descriptor reference 303B, file descriptor reference 303C) residing in file descriptor heap 302, and file descriptor reference 303A was first created followed by file descriptor reference 303B which was followed by file descriptor reference 303C. If only time was considered as a parameter for the policy as to which file descriptor references 303 to be collected, and the policy was that the most recently created would be collected, then file descriptor reference 303C would be collected. However, it may not be desirable to always collect the most recently crated file descriptor reference 303/object 304. Hence, the frequency count may also be considered as a parameter. The policy may include the aspect that those file descriptor references 303 that are used the most (highest frequency count) should remain stored in file descriptor heap 302. Since those file descriptor references 303 that are stored in file descriptor heap 302 the longest have a greater chance of having a higher frequency count, the time that file descriptor references 303 were created should also be considered. In this manner, a balanced approach is applied for determining which file descriptor references 303 and their referenced objects 304 are to be collected (i.e., cleaned) by the garbage collector during the garbage collection cycle.

In step 604, the garbage collector removes the identified file descriptor references 303 and their referenced objects 304 (those identified in step 603) during the garbage collection cycle for file descriptor heap 302.

In step 605, upon completion of the garbage collection cycle for file descriptor heap 302, the frequency count is set to 0 for all file descriptor references 303 that remain in file descriptor heap 302. This is to ensure that older file descriptor references 303 that were used frequently in the initial garbage collection cycle periods, but are not currently being used in the later garbage collection cycle periods, will not continue to survive in file descriptor heap 302 because of its initial heavy usage. As a result, a more accurate usage of the file descriptor references 303 during the period between consecutive garbage collection cycles for cleaning file descriptor heap 302 will be obtained.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for caching socket connections while ensuring that there are file descriptors available for applications, the method comprising:

creating a file descriptor reference to be associated with a cached socket connection, wherein said file descriptor reference references an object of said cached socket connection;

storing, by a processor, said file descriptor reference and said object of said cached socket connection in a predefined memory area of a heap;

determining a time that each file descriptor reference stored in said predefined memory area of said heap was created;

determining a frequency count for said each file descriptor reference stored in said predefined memory area of said heap after completion of a previous garbage collection cycle;

identifying file descriptor references and referenced objects that need to be collected by a garbage collector during a subsequent garbage collection cycle based on said determined time that said each file descriptor reference was created and based on said determined frequency count for said each file descriptor reference after said completion of said previous garbage collection cycle;

removing said identified file descriptor references and referenced objects during said subsequent garbage collection cycle; and resetting said frequency count to zero for all file descriptor references remaining in said predefined memory area of said heap upon completion of said subsequent garbage collection cycle.

2. The method as recited in claim 1 further comprising:
triggering a garbage collection cycle for collecting file descriptor references and referenced objects in said predefined memory area of said heap in response to a number of file descriptors being open exceeding a threshold.

3. The method as recited in claim 1 further comprising:
triggering a garbage collection cycle for collecting file descriptor references and referenced objects in said predefined memory area of said heap in response to said predefined memory area reaching a storage capacity.

4. A computer program product embodied in a computer readable storage medium for caching socket connections while ensuring that there are file descriptors available for applications, the computer program product comprising the programming instructions for:

creating a file descriptor reference to be associated with a cached socket connection, wherein said file descriptor reference references an object of said cached socket connection;

storing said file descriptor reference and said object of said cached socket connection in a predefined memory area of a heap determining a time that each file descriptor reference stored in said predefined memory area of said heap was created;

determining a frequency count for said each file descriptor reference stored in said predefined memory area of said heap after completion of a previous garbage collection cycle;

identifying file descriptor references and referenced objects that need to be collected by a garbage collector during a subsequent garbage collection cycle based on said determined time that said each file descriptor reference was created and based on said determined frequency count for said each file descriptor reference after said completion of said previous garbage collection cycle;

removing said identified file descriptor references and referenced objects during said subsequent garbage collection cycle; and resetting said frequency count to zero for all file descriptor references remaining in said predefined memory area of said heap upon completion of said subsequent garbage collection cycle.

5. The computer program product as recited in claim 4 further comprising the programming instructions for:
triggering a garbage collection cycle for collecting file descriptor references and referenced objects in said predefined memory area of said heap in response to a number of file descriptors being open exceeding a threshold.

6. The computer program product as recited in claim 4 further comprising the programming instructions for:
triggering a garbage collection cycle for collecting file descriptor references and referenced objects in said predefined memory area of said heap in response to said predefined memory area reaching a storage capacity.

7. A system, comprising:

a memory unit for storing a computer program for caching socket connections while ensuring that there are file descriptors available for applications; and a processor coupled to said memory unit, wherein said processor, responsive to said computer program, comprises:

circuitry for creating a file descriptor reference to be associated with a cached socket connection, wherein said file descriptor reference references an object of said cached socket connection;

circuitry for storing said file descriptor reference and said object of said cached socket connection in a predefined memory area of a heap circuitry for determining a time that each file descriptor reference stored in said predefined memory area of said heap was created;

circuitry for determining a frequency count for said each file descriptor reference stored in said predefined memory area of said heap after completion of a previous garbage collection cycle;

circuitry for identifying file descriptor references and referenced objects that need to be collected by a garbage collector during a subsequent garbage collection cycle based on said determined time that said each file descriptor reference was created and based on said determined frequency count for said each file descriptor reference after said completion of said previous garbage collection cycle;

circuitry for removing said identified file descriptor references and referenced objects during said subsequent garbage collection cycle; and circuitry for resetting said frequency count to zero for all file descriptor references remaining in said predefined memory area of said heap upon completion of said subsequent garbage collection cycle.

8. The system as recited in claim 7, wherein said processor further comprises:
   circuitry for triggering a garbage collection cycle for collecting file descriptor references and referenced objects in said predefined memory area of said heap in response to a number of file descriptors being open exceeding a threshold.

9. The system as recited in claim 7, wherein said processor further comprises:
   circuitry for triggering a garbage collection cycle for collecting file descriptor references and referenced objects in said predefined memory area of said heap in response to said predefined memory area reaching a storage capacity.

* * * * *